(12) United States Patent
Kim

(10) Patent No.: US 7,792,064 B2
(45) Date of Patent: Sep. 7, 2010

(54) VIDEO-CONFERENCING SYSTEM USING MOBILE TERMINAL DEVICE AND METHOD FOR IMPLEMENTING THE SAME

(75) Inventor: Jeong-Min Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1332 days.

(21) Appl. No.: 10/989,130

(22) Filed: Nov. 15, 2004

(65) Prior Publication Data

US 2005/0111388 A1 May 26, 2005

(30) Foreign Application Priority Data

Nov. 19, 2003 (KR) ...................... 10-2003-0082284
Dec. 2, 2003 (KR) ...................... 10-2003-0086876

(51) Int. Cl.
*H04L 12/66* (2006.01)
*H04W 4/00* (2009.01)
*H04N 7/14* (2006.01)

(52) U.S. Cl. ...................... 370/261; 370/338; 348/14.08

(58) Field of Classification Search .............. 348/14.08, 348/14.09; 370/390, 338, 254, 261; 709/228; 455/436

See application file for complete search history.

(56) References Cited

U.S. PATENT DOCUMENTS 6,957,069 B2* 10/2005 Shah et al. .................. 455/436

2003/0026253 A1* 2/2003 Burger et al. ............... 370/390
2004/0125778 A1* 7/2004 Lin et al. ..................... 370/338
2005/0078172 A1* 4/2005 Harville et al. ........... 348/14.09
2005/0117525 A1* 6/2005 Poustchi et al. ............. 370/254
2006/0174015 A1* 8/2006 Arauz-Rosado ............. 709/228

FOREIGN PATENT DOCUMENTS

| CN | 1383329 | 12/2002 |
|---|---|---|
| KR | 101998027902 | 7/1998 |
| KR | 1020000071273 | 11/2000 |
| WO | WO 02/49276 A2 | 6/2002 |

OTHER PUBLICATIONS

Brent A, Mller, et al.: "Home Networking with Universal Plug and Play", IEEE Communications Magazine, Dec. 2001. p. 104-109.

* cited by examiner

*Primary Examiner*—Ahmad F Matar
*Assistant Examiner*—Sonia Gay
(74) *Attorney, Agent, or Firm*—Lee, Hong, Degerman, Kang & Waimey

(57) ABSTRACT

In a video-conferencing system using a mobile terminal device and a method for implementing the same, by connecting mobile terminal devices, which have a wireless LAN module, a camera module and a video conference application program, to each other by a wireless LAN and by performing communications using wireless LAN Adhoc mode between the mobile terminal devices, the cost spent implementing a video-conferencing system is reduced and the free mobility can be secured in a place where people frequently move such as a building office, a warehouse of a distribution company or a temporary event place.

24 Claims, 3 Drawing Sheets

VIDEO-CONFERENCING SYSTEM USING MOBILE TERMINAL DEVICE AND METHOD FOR IMPLEMENTING THE SAME

CROSS-REFERENCE TO RELATED APPLICATIONS

Pursuant to 35 U.S.C. §119(a), this application claims the benefit of earlier filing date and right of priority to Korean Patent Application Nos. 10-2003-82284 and 10-2003-86876 filed on Nov. 19, 2003 and Dec. 2, 2003, respectively, the contents of which are hereby incorporated by reference herein in their entirety.

BACKGROUND OF THE INVENTION

1. Field of the Invention

The present invention relates to a video conference, and more particularly, to a video-conferencing system using a mobile terminal device and a method for implementing the same, in which a two-way or a multiparty video conference can be conducted freely in a place where people move frequently using the mobile terminal device.

2. Description of the Background Art

In general, a Wireless LAN is a data communication system in which a user is able to transmit and receive a data in the air by radio using a Radio Frequency. With this technique, the user can transmit and receive the data while moving freely in a certain area. There are mainly two kinds of networking communication methods using such a wireless LAN. One method is Adhoc mode and the other one is Infrastructure mode.

In Adhoc mode, each of mobile terminals independently exists in a space and each of them connects all the mobile terminals within a radius which it can recognizes so as to build a network. Without adding a separate access point (AP), communications can be performed between the mobile terminals within the network. Such Adhoc mode is a network suitable for typically building a small-scale network for a small office or an individual.

In infrastructure mode, the mobile terminals can connect each other by radio while using the existing cable network, and the access point (AP) for connecting the cable network to a wireless network is required. That is, the access point connects one cell to each of terminals or one cell to another cell, and provides routing and bridging operations between the terminal and a wire LAN. Accordingly, the infrastructure mode constructs a large-scale network between a server and a client or a multiple access point network for the Internet connection and allows roaming.

Meanwhile, because the Internet has come into wide use and its speed has been increased recently, a lot of jobs have been performed through a video conference. Therefore, a system and a terminal have been developed to conduct such a video conference. However, in the conventional video-conferencing system, the access point functioning as a base station is provided. Accordingly, there is a disadvantage that it costs much to build the system. In addition, the conventional video-conferencing system causes lots of inconveniences when conducting the video conference in a place which requires mobility or when building a small-scale network which does not require connection to the outside network.

SUMMARY OF THE INVENTION

Therefore, an object of the present invention is to provide a video-conferencing system using a mobile terminal device and a method for implementing the same in which a one-to-one or a multiparty video conference is conducted through Adhoc mode with a low cost without using an access point functioning as a base station.

Another object of the present invention is to provide a video-conferencing system and a method for implementing the same using the mobile terminal device capable of conducting a one-to-one or a multiparty video conference through wireless Adhoc mode to secure the free mobility without limit according to connection with the outside network through a cable network.

To achieve these and other advantages and in accordance with the purpose of the present invention, as embodied and broadly described herein, there is provided a video-conferencing system using a mobile terminal device comprising: a data input means receiving a data for conducting a video conference; a control means for performing a synchronization for links between connected users, and storing, processing and managing the inputted data; and a data output means for informing the data supplied from the control means of the connected user to thereby conduct the video conference.

To achieve these and other advantages and in accordance with the purpose of the present invention, as embodied and broadly described herein, there is provided a method for implementing a video conference using a mobile terminal device, comprising: connecting mobile terminal devices, which have a wireless LAN module and a video conference application software, to each other by the wireless LAN; and performing communications between the mobile terminal devices through the wireless LAN Adhoc mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
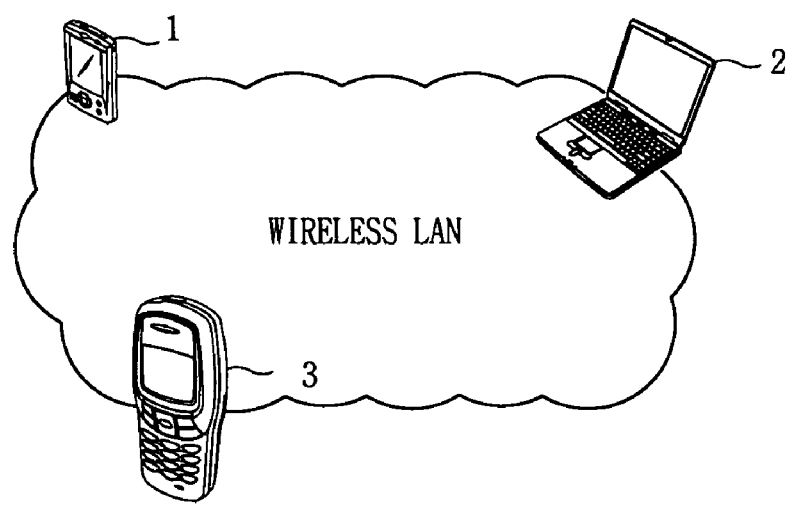
FIG. 1 is a construction view schematically showing a video-conferencing system using a mobile terminal device in accordance with the present invention.

FIG. 1 is a construction view schematically showing a video-conferencing system using a mobile terminal device in accordance with the present invention.

As shown in FIG. 1, in a video-conferencing system in accordance with the present invention, a plurality of mobile terminal devices 1, 2 and 3 are connected to each other through a wireless LAN. The mobile terminal devices carry out communications through wireless LAN Adhoc mode. Here, a PDA 1, a notebook 2 and a cellular phone 3 are drawn as the mobile terminal devices used for the present invention, but the video-conference system can include more mobile terminal devices of other kinds. In addition, the ITU Telecommunication Standardization Sector (ITU-T), an international standard organization, regulates different protocols according to communications network environments. For example, H.320 is a recommendation that sets standards for a video-conferencing system over Integrated Services Digital Network (ISDN), H.324 is a recommendation that sets standards for a video-conferencing system over Public Switched Telephone Network (PSTN), and H.323 is a recommendation that sets standards for a video-conferencing system over Local Area Network (LAN). Since the wireless LAN Adhoc mode is used as a video conference communications network in the present invention, the mobile terminal devices of FIG. 1 perform video communications by exchanging the H.323 protocols.

Figure 2:
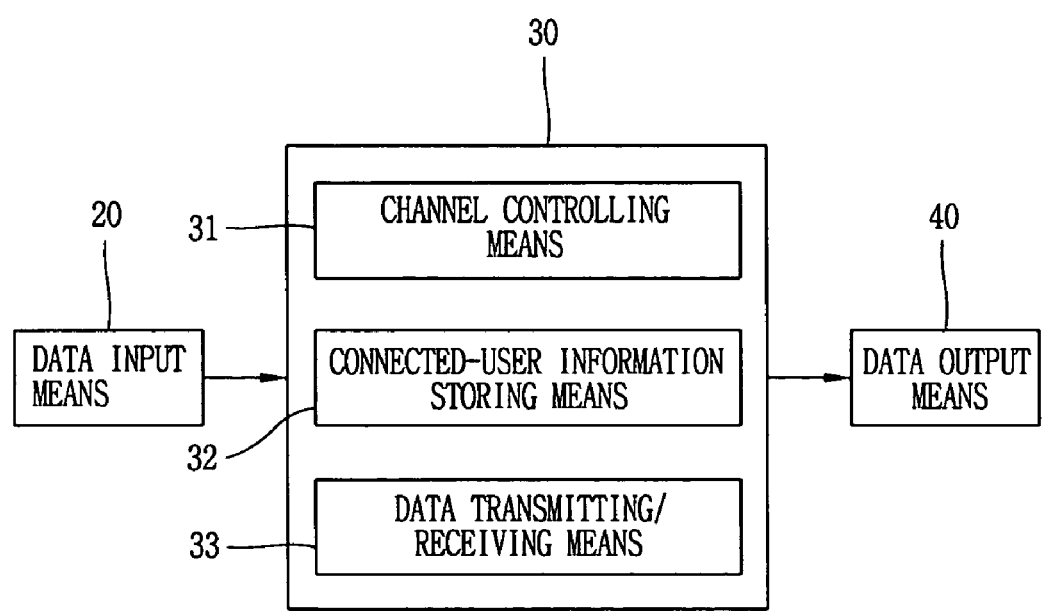
FIG. 2 is a view showing construction of a mobile terminal device used in the video-conferencing system in accordance with the present invention.

FIG. 2 is a view showing construction of a mobile terminal device used in the video-conferencing system in accordance with the present invention.

As shown in FIG. 2, a mobile terminal device of the present invention includes: a data input means 20 receiving a variety of data to conduct a video conference; a control means 30 for performing a synchronization for links between connected users through a wireless LAN module in the wireless LAN Adhoc network environments, and storing, processing and managing the inputted data; and a data output means 40 for informing the data supplied from the control means 30 of the connected user to thereby conduct the video conference. At this time, the mobile terminal device in accordance with the present invention further includes a video-conference application program for conducting the video conference. In addition, the video-conference application program should support the H.323 standard because the video communications are performed between the mobile terminal devices using the wireless LAN Adhoc mode.

The construction of the mobile terminal device in accordance with the present invention will be described more in detail.

Firstly, the data input means 20 is a means for receiving data supplied from the outside to conduct the video conference. In particular, a camera or a microphone can be used as the data input means for the purpose of the video conference like the present invention. In addition, the data means a computer file or text supplied from external terminals. In particular, when the purpose is the video conference like the present invention, the data refers to an image and a voice supplied through the camera or the microphone.

The control means 30 is made up of a channel controlling means, a connected-user information storing means and a data transmitting/receiving means.

The channel controlling means 31 receives the connected users' IP addresses of external terminals and controls the IP addresses according to the channels. When the external terminal is connected, the channel controlling means 31 performs updates of the channel of the external terminal being connected. In addition, the channel controlling means 31 controls whether or not to permit the connection when making a request for connection or when being given the request for connection.

The connected-user information storing means 32 is supplied and stores a list of information on connected users which is supplied from the external terminals or a list of information on connected users which is set in advance. Here, the information on connected users includes the connected users' IP addresses, the connected users' connection statuses and information authenticating on the connected users' passwords.

The data transmitting/receiving means 33 exchanges data with the external terminals, checks the IP addresses of the connected users of the terminals respectively and transmits the received data to the user who belongs to the channel. A wireless LAN module using the Adhoc mode is used as the data transmitting/receiving means of the present invention.

Finally, the data output means 40 is a means for informing the data supplied from the external terminal of the user. A monitor for displaying an image or a speaker for outputting a voice can be used as the data output means 40.

Figure 3:
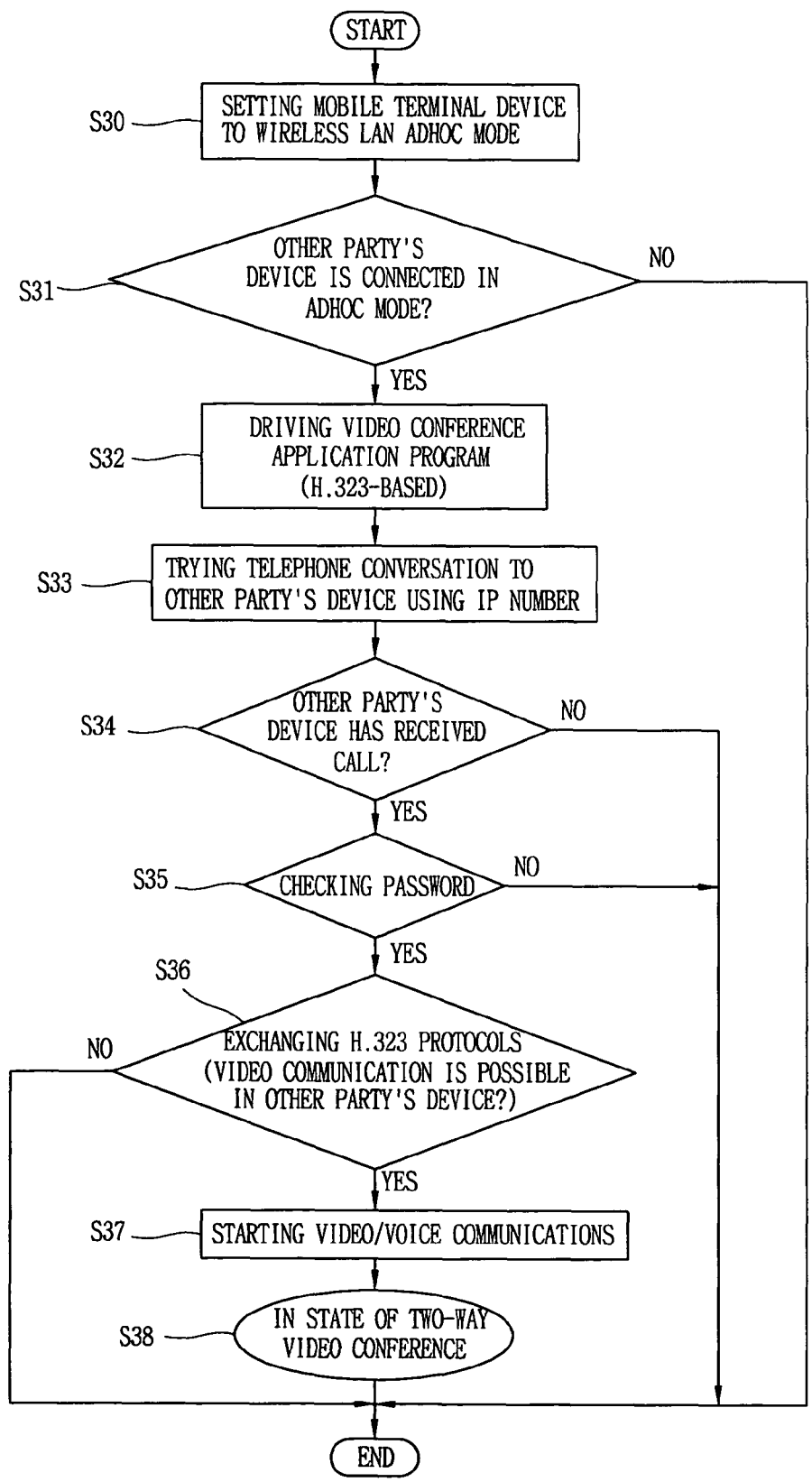
FIG. 3 is a flowchart showing a method for conducting a one-to-one video conference.

FIG. 3 is a flowchart showing a method for conducting a one-to-one video conference.

Firstly, authorization for controlling and using a channel through the wireless LAN Adhoc mode can be programmed to be given to all the mobile terminal devices constructing the video-conferencing system or to only one mobile terminal device which is chosen as a master out of a plurality of mobile terminal devices constructing the video-conferencing system. However, for the purpose of convenient description as described in the embodiment of the present invention, a person who opens a conference is supposed to set the authorization in advance when opening the conference first.

As shown in FIG. 3, a user who first opens a conference becomes a master in a state of the wireless LAN Adhoc mode. This is to grasp the other user who participates in the video conference and the current status of the other user and to assure that video/voice data are reliable. Namely, the user who first opens the conference sets his or her own mobile terminal device to the wireless LAN Adhoc mode (S30). At this time, in order to set the mobile terminal device to the wireless LAN Adhoc mode, a service set identifier (SSID) and an encryption key which are determined to be identical in advance between the users are set.

When the mobile terminal device is set to the wireless LAN Adhoc mode, it is checked whether the other party's mobile terminal device is connected in the wireless LAN Adhoc mode. In case that the other party's mobile terminal device is not in the wireless LAN Adhoc mode, a process of the video conference is terminated (S31).

Thereafter, when other party's mobile terminal device is in the wireless LAN Adhoc mode, a video conference application program is driven (S32). Here, a program which enables the mobile terminal device to perform voice communication through a voice over Internet protocol (VoIP) function is used as the video conference application program. The voice over Internet protocol (VoIP) is a communication service technique that the packet network for data communication is used for the Internet telephony. The VoIP changes voice data into Internet protocol data packets, which makes it possible to have a telephone conversation in a general telephone network.

When the video conference application program is driven, a telephone conversation is tried by sending a call to the other party's mobile terminal device using an IP number (S33). It is determined whether the other party's mobile terminal device receives the call by the call (S34). The user determines whether a password inputted when the other party's mobile terminal device is connected coincides with the password set in advance (S35). At this time, when the passwords do not coincide with each other, the other party's access is terminated. When the other party's mobile terminal device receives the call, it is checked whether video communication is possible by exchanging H.323 protocols. When the other party's mobile terminal device does not receive the call, the process of the video conference is terminated (S36). For example, it is checked whether the other party's video conference application program is driven. If the video conference application program does not exist, the video conference is terminated.

Finally, when the video communication is possible in the other party's mobile terminal device, video/voice communications with other party start to thereby be in a state of a two-way video conference (S37 and S38). If the video communication is impossible, the process of the video conference is terminated. At this time, if the video communication is possible, image and voice data are is inputted to a data input means of the terminal of the other connected user conducting the video conference, and are outputted as an image or a voice through a data output means.

Figure 4:
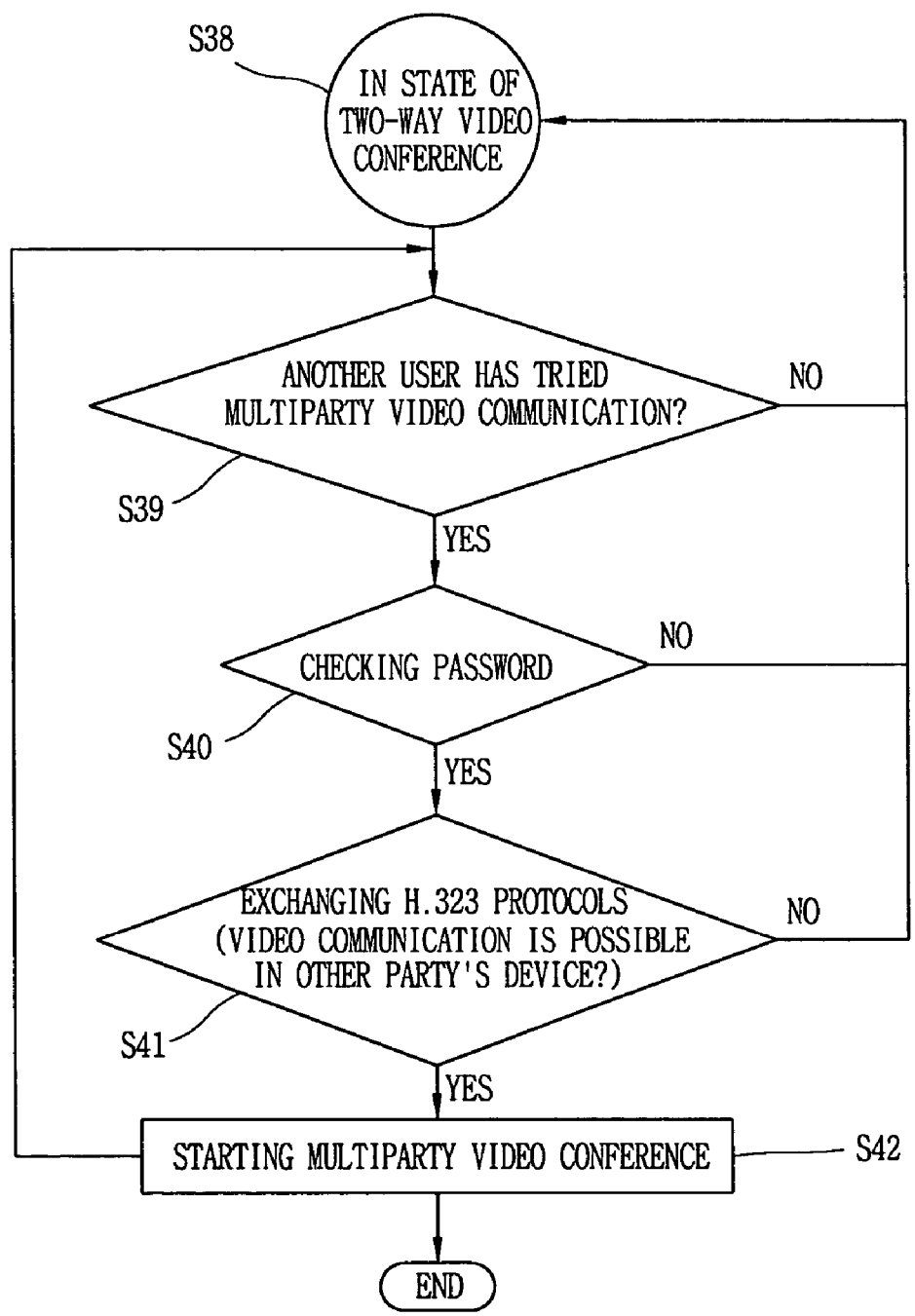
FIG. 4 is a flow chart showing a method for conducting a multiparty video conference by the mobile terminal device in accordance with the present invention.

FIG. 4 is a flow chart showing a method for conducting a multiparty video conference by the mobile terminal device in accordance with the present invention.

Firstly, the multiparty video conference is classified into a central method, a distributed method and a mixed method of the two. Preferably, in the present invention, the distributed method is used for the wireless LAN Adhoc environments in a limited area and the simplification of the implementation.

In order to conduct a multiparty video conference of the distributed method in accordance with the present invention, as shown in FIG. 3, one of users becomes a master and the master conducts a two-way video conference by driving a video conference application program (S30 to S38). Thereafter, in a state of the two-way video conference, a third connected user who wants to take part in the video conference tries to connect his or her own mobile terminal device to a master's mobile terminal device (S39).

Thereafter, it is checked whether a password inputted when the third connected user is connected coincides with the password set in advance. In case the passwords do not coincide with each other, the third connected user's access is terminated (S40). Accordingly, as the master terminal limits the number of connected users who will participate in a conference in advance, problems caused by processing an excessive amount of data and a matter of security in case of a conference which needs to be kept secret can be solved.

When another user's mobile terminal device is connected to the master, it is checked whether video communication is possible by exchanging H.323 protocols (S41). If it is not connected to the master, a state of the existing two-way video conference is maintained (S38).

After being connected to the master, if another user's mobile terminal device can conduct the video communication, the multiparty video conference (a three-way video conference) starts (s42). If the video communication is impossible, the state of the two-way video conference is maintained (S38).

Thereafter, as another users try to be connected to the master additionally, the multiparty video conference such as a four-way or a five-way video conference can be conducted.

As described so far, in the present invention, a video conference is conducted by being provided with mobile terminal devices having a wireless LAN module, a camera module and a video conference application program and by performing communications using wireless LAN Adhoc mode between the mobile terminal devices. Accordingly, an access point functioning as a cable network or a base station is not required, so that the cost spent implementing a video-conferencing system is reduced and the free mobility can be secured in a place where people frequently move such as a building office, a warehouse of a distribution company or a temporary event place.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds is of the claims, or equivalence of such metes and bounds are therefore intended to be embraced by the appended claims.

What is claimed is:

1. A mobile terminal device comprising:
 a data input means receiving data for conducting a video conference with an external terminal comprising a wireless LAN module, a camera module, and a video conference application software;
 a control means for synchronizing a connection for communication with the external terminal, initiating a video communication via a wireless LAN Adhoc mode, and for storing, processing, and managing the input data; and
 a data output means for outputting information associated with the video conference,
 wherein the control means initiates the video communication with the external terminal by sending a call from the mobile terminal device to the external terminal via an IP address pre-stored in the mobile terminal device,
 wherein the control means determines if the external terminal has received the call, has input a correct password, is capable of video communication via a H.323 protocol, and has initiated a video conference application program before synchronizing communication.

2. The mobile terminal device of claim 1, wherein the mobile terminal device conducts video communication by exchanging H.323 protocol.

3. The mobile terminal device of claim 1, wherein the mobile terminal device is a PDA, a notebook or a cellular phone.

4. The mobile terminal device of claim 3, wherein the mobile terminal device further comprises a video conference application program configured to conduct a video conference which supports the H.323 standard.

5. The mobile terminal device of claim 1, wherein the data input means comprises a camera module configured to receive the data and is at least one of a camera or a microphone.

6. The mobile terminal device of claim 5, wherein the data refers to a computer file, text, an image or a voice supplied from the external terminal.

7. The mobile terminal device of claim 1, wherein the control means comprises:
 a channel controlling means receiving an IP address of a connected external terminal and controlling the IP address according to channels;
 a storing means for storing a list of information on the connected external terminal or a list of information on the connected external terminal stored in advance; and
 a data transceiver for transmitting and receiving data with the external terminal.

8. The mobile terminal device of claim 7, wherein the channels channel controlling means performs updates of the channel of the external terminal being connected when the external terminal is connected.

9. The mobile terminal device of claim 7, wherein the channel controlling means controls whether or not to permit the connection when making a request for connection or when being given the request for connection.

10. The mobile terminal device of claim 7, wherein the information on the connected external terminal comprises the connected external terminal's IP address, the connected external terminal's connection status and information on authenticating the connected external terminal's password.

11. The mobile terminal device of claim 7, wherein the data transceiver transmitting/receiving means checks the connected external terminal's IP address and transmits the received data to another connected user who external terminal which belongs to the channel.

12. The mobile terminal device of claim 11, wherein the data transceiver is a wireless LAN module using the Adhoc mode.

13. The mobile terminal device of claim 1, wherein the data output means is a monitor for displaying an image or a speaker for outputting a voice.

14. A method for implementing a video conference using a mobile terminal device, comprising:
   connecting a plurality of mobile terminal devices comprising a wireless LAN module, a camera module, and a video conference application software, wherein the plurality of mobile terminal devices are connected via the wireless LAN module; and
   performing communications between the plurality of mobile terminal devices via a wireless LAN Adhoc mode,
   wherein the communications between the plurality of mobile terminal devices comprises initiating a video communication by sending a call from a first mobile terminal device to a second mobile terminal device via an IP address of the second mobile terminal pre-stored in the first mobile terminal device, and further comprises determining if the second mobile terminal has received the call, has input a correct password, is capable of video communication via a H.323 protocol, and has initiated a video conference application program before performing communications between the plurality of mobile terminal devices.

15. The method of claim 14, wherein the plurality of mobile terminal devices perform communications by exchanging the H.323 protocols.

16. The method of claim 14, wherein, in order to set the wireless LAN Adhoc mode, a service set identifier (SSID) and an encryption key which are determined to be identical in advance between the users are set.

17. The method of claim 14, wherein the video conference application program is a voice communication program through a VoIP function.

18. The method of claim 14, wherein the communications between the mobile terminal devices further comprises:
   setting the first mobile terminal device to the wireless LAN Adhoc mode;
   checking whether the second mobile terminal device is connected in the wireless LAN Adhoc mode;
   terminating a process of a voice conference when the second mobile terminal device is not in the wireless LAN Adhoc mode and driving the video conference application program when it is in the wireless LAN Adhoc mode;
   checking whether video communication is possible by exchanging the H.323 protocols when the second mobile terminal device receives the call and terminating the process of the video conference when it does not receive the call; and
   terminating the process of the video conference when the video communication is not possible in the second mobile terminal device.

19. The method of claim 14, wherein determining an input of a correct password comprises:
   determining whether a password input when the second mobile terminal device is connected to the first mobile terminal matches the password set in advance and terminating the second mobile terminal device's access when the passwords do not match.

20. The method of claim 18, wherein, when the video communication is possible, image and voice data are transmitted to a data input means of the second mobile terminal device conducting the video conference, and the second mobile terminal device outputs at least one of an image or a voice via a data output means.

21. The method of claim 18, wherein the video communication provides at least one of a computer file, text, or an image in addition to a voice supplied via at least one of a camera or a microphone.

22. The method of claim 18, further comprising:
   attempting a second connection between a third mobile terminal device and the first mobile terminal device;
   determining whether the third mobile terminal device can perform video communication by exchanging the H.323 protocols when connected to the first mobile terminal device; and
   initiating a multiparty video conference if the third mobile terminal device can perform video communication and maintaining a two-way video conference between the first and second mobile terminal devices if the third mobile terminal device cannot perform the video communication.

23. The method of claim 22, further comprising:
   determining whether a password input into the third mobile terminal device connected with the first mobile terminal matches the password set in advance and the third mobile terminal device's access is terminated if the passwords do not match.

24. The method of claim 22, wherein authorization for controlling and using a channel in the wireless LAN Adhoc mode via the password can be programmed to be given to all of the plurality of mobile terminal devices utilizing the video-conferencing system or to only a specific mobile terminal device which is chosen as a master out of a plurality of mobile terminal devices utilizing the video-conferencing system.

* * * * *